Oct. 2, 1934.　　　A. R. SCHOLIN　　　1,975,126
INTERMITTENT DRIVE
Filed April 8, 1932　　　2 Sheets-Sheet 1

Inventor:-
Axel R. Scholin,
By Kent W. Wonn Atty.

Oct. 2, 1934.  A. R. SCHOLIN  1,975,126
INTERMITTENT DRIVE
Filed April 8, 1932   2 Sheets-Sheet 2
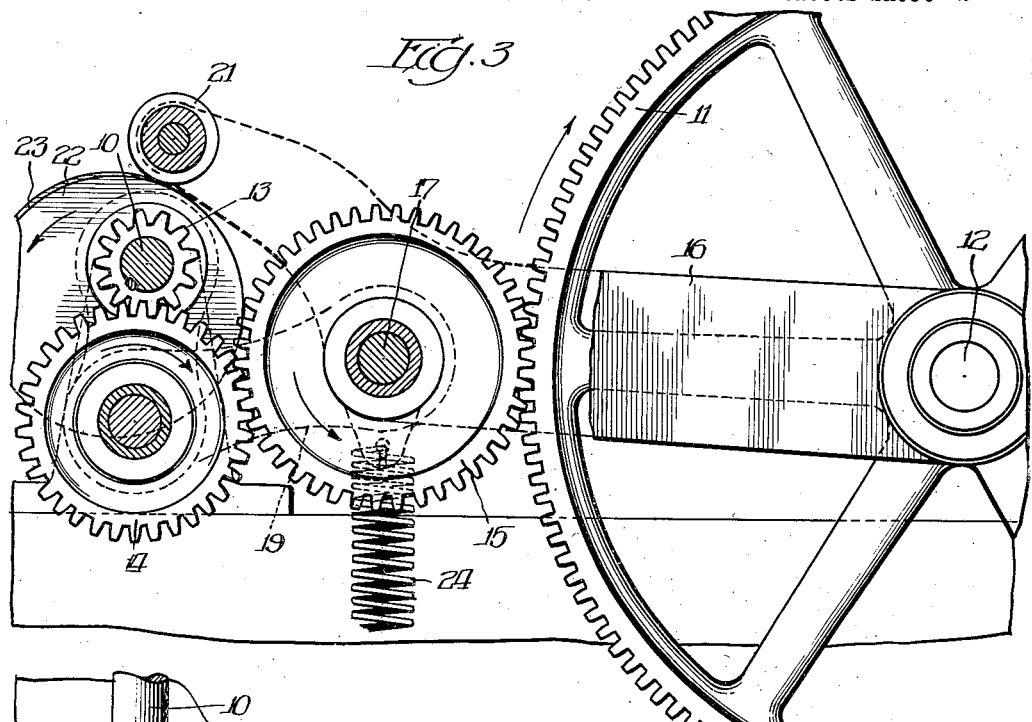
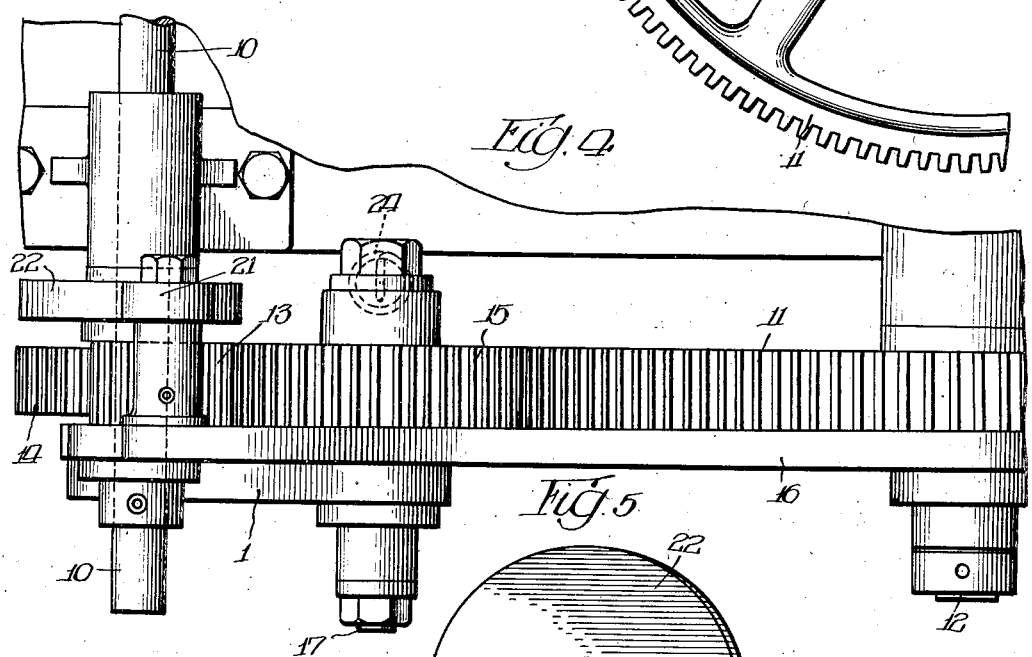
Inventor
Axel R. Scholin,
By Kent W. Worrell Atty

UNITED STATES PATENT OFFICE 1,975,126

INTERMITTENT DRIVE

Axel R. Scholin, Chicago, Ill.

Application April 8, 1932, Serial No. 603,946

9 Claims. (Cl. 74—7)

This invention relates in general to a mechanism for converting continuous rotary movement to an intermittent or step by step movement, and has more particular reference to a power gear mechanism for intermittently transmitting power without disconnecting the gears.

One of the principal objects of the invention is in the provision of power drive gearing in which the gears are continuously in mesh for the purpose of converting uniform continuous rotary movement into a step by step intermittent rotary movement.

A further object of the invention is in the provision of an intermittent drive in which the driven mechanism is at rest or substantially at rest for a portion or portions of each rotation.

A further object of the invention is in the provision of an intermittent power gearing of this kind in which the gearing accelerates and decelerates in producing the intermittent movement.

A still further object of the invention is in the provision of an intermittent power gearing in which a driving pinion is driven at constant speed and the driven gear moves intermittently with intermediate gearing actuated to rock by means of a continuously moving cam, the gearing being moved to walk over the driven gear through a portion of the movement without effecting the movement of the driven gear in either direction.

Other objects of the invention will appear hereinafter, a preferred embodiment of the invention being illustrated in the accompanying drawings.

In the drawings, Fig. 1 shows an intermittent power gearing in accordance with the principles of this invention;

Fig. 3 is a view of the gearing, with some of the parts broken away, in a different operating position;

Fig. 4 is a plan view of the gearing; and

Fig. 5 is an elevation of an operating cam.

Figure 1:
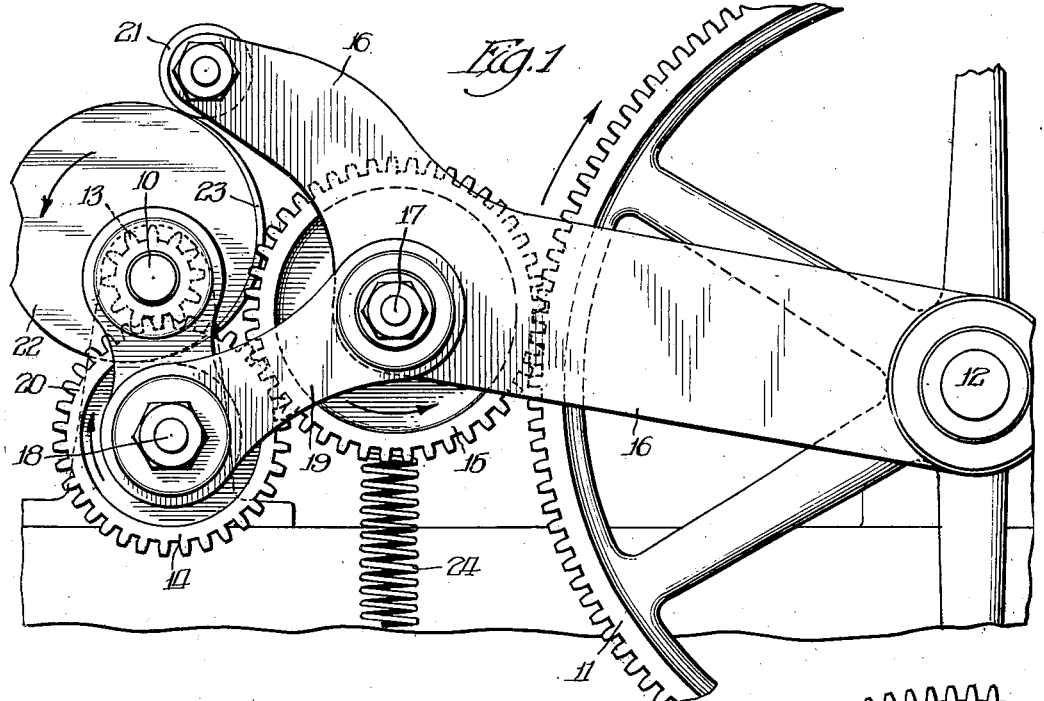
Figure 2:
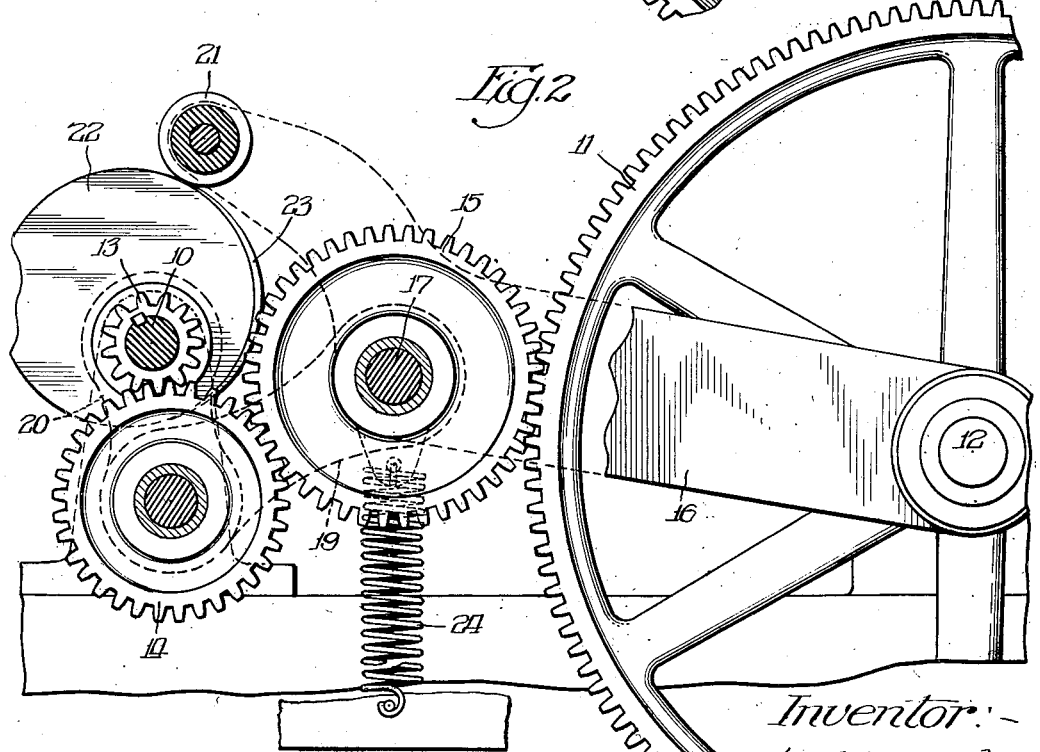
Fig. 2 is a similar view with some of the parts broken away for clearness.

In converting continuous rotary movement to intermittent step by step movement it is customary to employ pawl and ratchet, Geneva, or other reciprocating gearing to start and stop the part to be actuated, or to employ some sort of a clutch mechanism which is intermittently actuated. It may be used in any mechanical art which requires stop motion gearing such as wrapping machines, motion picture projectors, tag stringing machines and the like.

The present invention has for its principal object to provide a power gearing in which the driving and driven parts are always interconnected and in which there is no separation of the parts nor any intermittently operated clutch to produce the step by step movement.

In the present case the object is obtained by mounting a cam upon the continuously rotating driving shaft and to mount the connecting gearing upon a rocking arm which engages the cam, the arm and connecting gearing causing the driven member to have an acceleration period, a deceleration period and a quiet period, which by proper variation of the driving gears may be each approximately one-third of the time of each rotation of the driving shaft and its pinion.

Referring now more particularly to the drawings, an intermittent drive mechanism is shown comprising a power shaft 10 which is driven continuously and uniformly in one direction and a gear wheel 11 mounted upon a shaft 12 which is driven intermittent or with a step by step movement in one direction. The driving and driven shafts 10 and 12 are relatively fixed in position at all times and are continuously connected by a driving gearing which causes the step by step actuation.

The connecting and driving gearing comprises a pinion 13 keyed to the shaft 10 and meshing with a gear 14 which in turn meshes with a gear 15 which is directly connected to the driven gear wheel 11. The gear 15 is carried by a lever 16 which is pivoted at one end upon the shaft 12 and carries the gear upon a bearing pin 17 in fixed, axial relation to the teeth of the gear wheel 11. In order to connect the gear 14 to the pinion 13 and the other gear 15 and to maintain it in proper position at all times, it is mounted upon a bearing pin 18 and connected by arms 19 and 20 with the bearing pin 17 and the shaft 10 respectively, the arms being separate and relatively movable upon the bearing pin 18 so that the gears 14 and 15 may be rocked or moved relatively to the fixed shafts 10 and 12 without disengagement from the pinion 13 and gear wheel 11.

In order to effect a rocking movement of the gears 14 and 15 the lever 16 carries a contact roller 21 at its outer or free end which engages a cam 22 secured to and rotatable with the continuously rotating shaft 10. The contour of this cam determines the throw or movement of the lever 16 and while the cam is nearly circular it is preferable to add a thin crescent of material 23 on the decelerating side of the cam in order to maintain the proper relation between the driving gears, to prevent back lash, and to insure that there will be no reverse movement of the gear wheel 11 during its normal operation.

In order to maintain the contact roller 21 in engagement with the cam 22, a spring 24 may be connected at one end to the lever or to the bearing pin 17 thereof, and at the other end to a fixed support such as the frame upon which the driving mechanism is carried. It is also contemplated that a box cam may be substituted for the simple cam 22 to eliminate the spring 24 if desired.

With this construction it is obvious that the continuous rotation of shaft 10 will drive the pinion 13 and through it the gears 14, 15, and 11; that the rotation of the cam 22 will cause a rocking movement of the lever 16 from an upward position, as shown in Fig. 1, to a lower position, as shown in Fig. 3; and that this rocking movement of the lever will cause a corresponding rocking movement of the gears 14 and 15 with respect to the pinion 13 and the gear wheel 11, such that when the lever is moving downward, the gear 15 will be caused to walk idly about the gear wheel 11, causing no movement thereof, but when the lever is moved upwardly by its cam 22 the gearing connection will cause the gear wheel 11 to be moved a portion of a rotation. By having the cam graduated in both directions between its high and low points, a gradual acceleration and deceleration of the motion transmitted between the shafts 10 and 11 is obtained with the result that the gear wheel 11 and the shaft 12 are not abruptly started or stopped but they are driven smoothly and continuously with a gradually increasing and then a decreasing movement, and with a period of rest depending upon the shape and size of the cam 22, and amounting if desired to one-third or approximately one-half of the rotation of the driving shaft 10. This operation of the mechanism makes it particularly desirable for transmitting power to machines which have intermittently movable parts, in which a stop movement is desired for a considerable portion of the rotation of the driving shaft. The period of the stop movement and the amount of movement of the driven wheel may be varied by changing the sizes of the gears forming the driving connection and by varying the size and shape of the actuating cam 22.

I claim:

1. An intermittent drive comprising a continuously rotating drive shaft with a drive pinion thereon, a spaced shaft and a gear to be intermittently rotated, and an intermediate driving connection comprising two gears in mesh with each other and each of said last mentioned gears in mesh with one of the other said gears, and means for mounting and rocking said intermediate gears, comprising a cam on the drive shaft and a lever controlled by the cam for rocking the intermediate gears to actuate the driven gear intermittently by their rocking movement.

2. In an intermittent drive, a continuously rotatable shaft having a driving pinion thereon, a gear for intermittent rotation, driving gearing connecting the said pinion and gear, the gearing comprising two gears in mesh with each other, one of the gears meshing with the pinion and the other gear meshing with the gear to be intermittently moved, a cam carried by the drive shaft, a lever rotatable about the axis of the intermittent drive gear and engaged for movement by the cam, the gear in mesh with the intermittent driven gear being mounted upon the lever, and means for connecting the other gear in mesh with the pinion at a fixed distance therefrom and from the other intermediate gear, permitting the lever to rock both of them.

3. In an intermittent drive, a continuously rotating drive shaft and a pinion thereon, an intermittently rotatable driven shaft and a gear wheel thereon, driving gears connecting the pinion and intermittent gear, one of said gears being mounted and carried by a lever rotatable about the axis of the intermittently rotatable shaft and the other driving gear being mounted upon two arms movable relatively to each other, one pivoted about the axis of the other driving gear, and the other pivoted about the axis of the pinion, and means for rocking the driving gears comprising a cam on the driving shaft and an extension of said lever engaging the cam, and adapted to be rocked thereby and carry the driving gears therewith.

4. In an intermittent gearing, a driving shaft and a driving pinion thereon, a gear for intermittent rotation, a continuous driving connection between the pinion and gear comprising two gears, one in mesh with the pinion and the other in mesh with the intermittently, rotatable gear, means for maintaining the driving gears in mesh but permitting their relative movement with respect to each other, said means comprising a lever pivoted at one end about the axis of the intermittently movable gear, and carrying one of the intermediate gears, a pair of links for supporting the other intermediate gear, one link pivoted upon the drive shaft and the other link pivoted about the axis of the other driving gear, and means for rocking the driving gears relatively to each other, said means comprising an extension of the lever and a cam mounted upon the drive shaft and engaged by the extension.

5. An intermittent drive comprising a continuously rotatable drive shaft, a pinion mounted thereon, a shaft and a gear thereon for intermittent rotary movement, driving gears connected to the pinion and to the intermittent gear and to each other for transmitting movement therebetween, a mounting for permitting relative movement between the intermediate driving gears and maintaining them in mesh with each other, and with the pinion, and with the intermittently rotatable gear, said means including a lever pivoted about the axis of the intermittently rotatable shaft, and having an extension and a cam carried by the continuously rotatable drive shaft engaging the extension.

6. A structure in accordance with claim 5 in which the contact end of the lever is held yieldingly in engagement with the cam.

7. The combination with a continuously rotatable drive shaft and a drive pinion thereon, of an intermittently rotatable shaft and a driven gear thereon, a pair of driving gears in mesh with the pinion and the driven gear, means for mounting the driving gears for continuous driving engagement but for relative movement with respect to each other, a lever rotatable about the intermittent drive shaft and carrying one of the driving gears in engagement with the intermittent drive gear, said lever having an extension with a cam roller thereon, a cam carried by the drive shaft and continuously rotated in contact with said roller, and a spring to hold the lever and its roller in fixed engagement with the cam.

8. A structure in accordance with claim 5 in which the cam is substantially circular with a gradually increasing and decreasing addition at one side thereof which is engaged by the lever extension.

9. In a structure in accordance with claim 5 in which the cam has a substantially crescent shaped addition to one portion of its circular surface for affecting the movement of the lever in accordance therewith.

AXEL R. SCHOLIN.